June 8, 1943.  F. A. TREADWELL  2,321,263
SHOCK CORD HANDLING TOOL
Filed Dec. 11, 1941  2 Sheets-Sheet 1
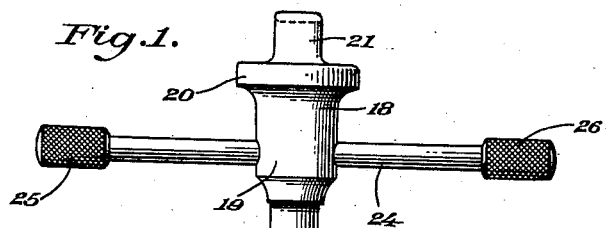
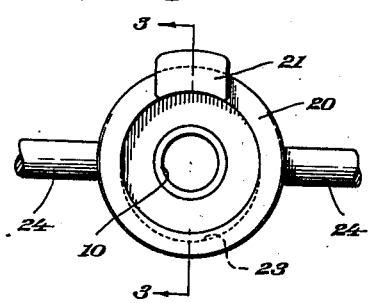
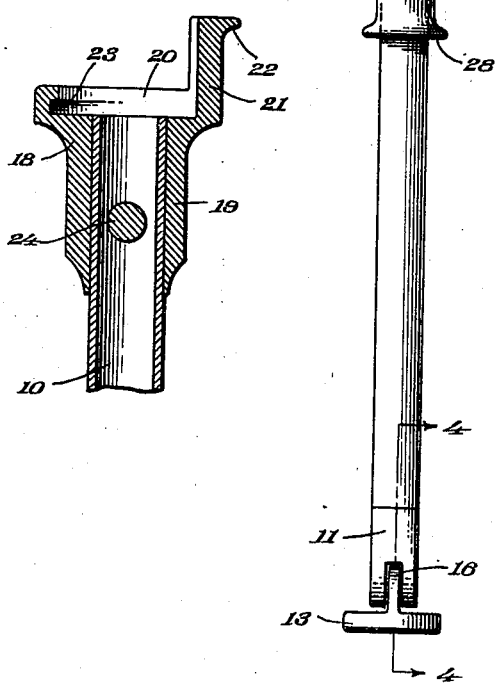
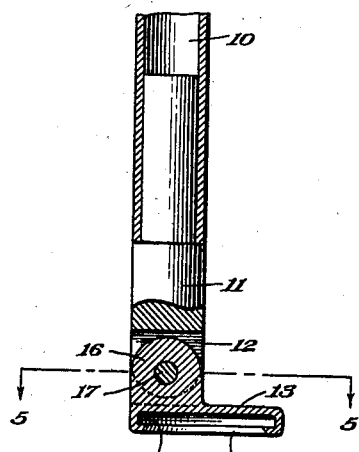
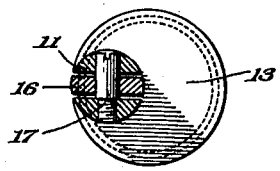
Frank A. Treadwell,
INVENTOR.
BY
Victor J. Evans & Co.
ATTORNEYS June 8, 1943.　　　F. A. TREADWELL　　　2,321,263
SHOCK CORD HANDLING TOOL
Filed Dec. 11, 1941　　　2 Sheets-Sheet 2
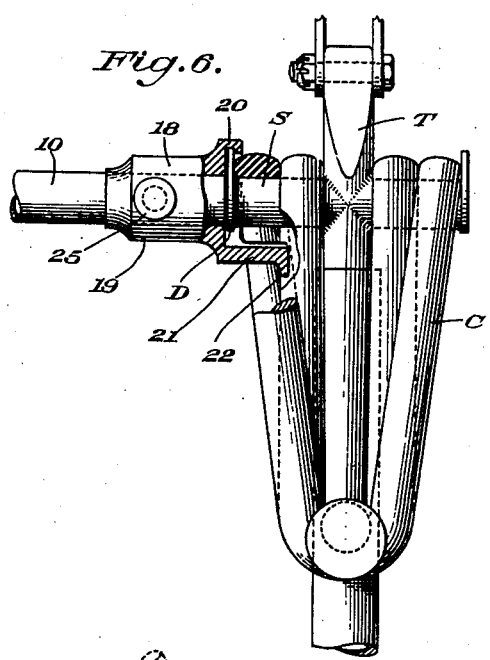
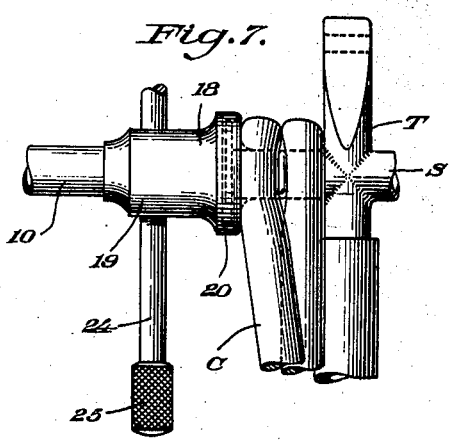
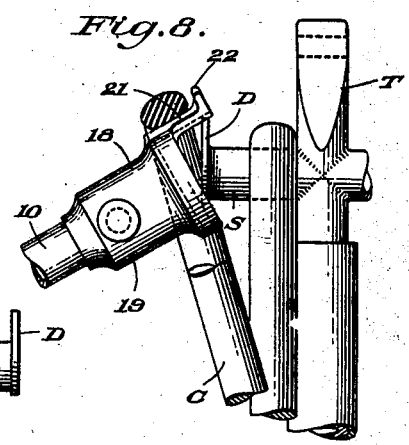
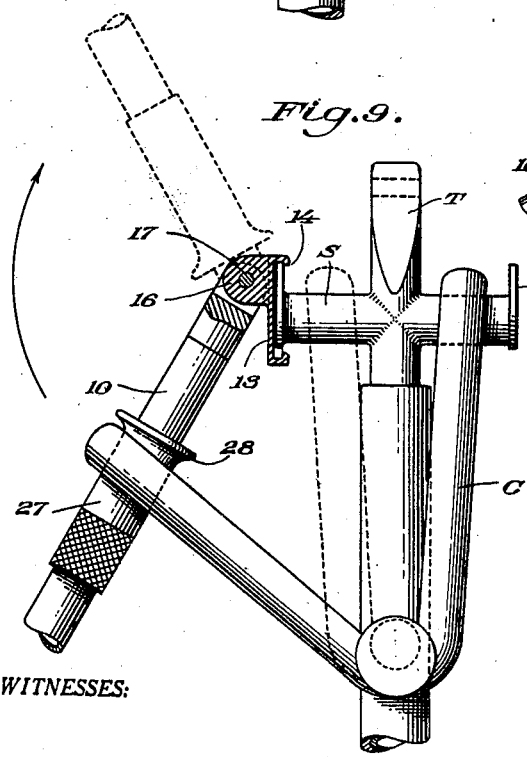
WITNESSES:
Frank A. Treadwell:
INVENTOR.
BY
*Victor J. Evans & Co.*
ATTORNEYS Patented June 8, 1943

2,321,263

UNITED STATES PATENT OFFICE 2,321,263

SHOCK CORD HANDLING TOOL

Frank A. Treadwell, Siloam Springs, Ark.

Application December 11, 1941, Serial No. 422,586

3 Claims. (Cl. 29—84)

The present invention relates to tools for handling shock cords of airplanes.

An object of the invention is to provide a shock cord handling tool which will greatly expedite the removal of the shock cord.

Another object of the invention is the provision of a shock cord handling tool designed to simplify the assembly of a shock cord.

A further object of the invention is the provision of a tool of the above character which will enable handling of a shock cord without damaging the cord or the cord wrapper.

Still another object of the invention is the provision of a shock cord handling tool constructed so that the shock cord can be disconnected or assembled in position with a minimum of time and labor.

A still further object of the invention is the provision of a tool of the aforesaid character which is comparatively simple and durable in construction and highly efficient in use.

Other objects and advantages will be apparent from the following description and appended claims.

In describing my invention in detail, reference will be had to the accompanying drawings illustrating a practical adaptation of the invention, and in which Figure 1 is a side elevational view of the complete tool, Figure 2 is an enlarged end view of the remover end of the tool, Figure 3 is a fragmentary longitudinal section taken on line 3—3 of Figure 2, Figure 4 is a fragmentary longitudinal section taken on line 4—4 of Figure 1, Figure 5 is a transverse section taken on line 5—5 of Figure 4, Figure 6 is a side elevational view, partly in section, showing the tool in cord removing position in association with an airplane landing gear, Figure 7 is a similar view showing the tool in a different position, Figure 8 is a similar view showing the tool in an advanced cord removing position, and Figure 9 is a side elevational view, partly in section, of the tool mounted for assembling a shock cord on an airplane landing gear.

With reference to the drawings, wherein like characters of reference denote corresponding parts throughout the several views, 10 designates an elongated body member which may be in the form of a round bar or mainly hollow structure provided at one end with a solid extension section 11 formed with a slot 12. This slotted end portion of the body connects with a mounting head 13 in the form of a flanged disk having an inwardly directed annular extension flange 14 providing an annular groove 15 in the periphery of the head. At the inner face of the disk is provided a laterally projecting apertured lug 16 disposed eccentrically of the disk and extending into the slot 12. A pivot pin 17 connects the lug 16 with the end portion of the body 10 so that the head 13 is pivotally adjustable with reference to the axis of the body.

On the opposite end of the body forming bar is removably mounted a removal head 18 embodying a tubular portion 19 bevelled at the inner end and having the outer end enlarged and shaped to form an annular boss 20 defining a shallow socket. At one side of the socket defining boss 20 is formed a longitudinal projection 21 providing a segmental finger extending outwardly of the head 18 and having an arcuate cross sectional contour concentric with the axis of the tubular portion 19. At the outer end of the projection 21 is formed a transverse lip 22 projecting radially and outwardly of the finger. As shown to advantage at Figures 2 and 3, that portion of the boss diametrically opposite the finger projection 21 is shaped to provide an eccentric groove 23 in an arcuate portion of the boss.

As best illustrated at Figures 1 and 3, a tubular portion 19 of the removal head is provided with diametrically opposed openings adapted to be aligned with corresponding openings in the end portion of the body bar 10 to slidably receive therethrough a turning rod 24 extending transversely of the body. On one end of the rod 24 is integrally formed an enlarged knurled knob 25 while the opposite end is exteriorly screw threaded to receive thereon an interiorly threaded removable knob 26. Thus, the rod 24 serves not only to removably connect the head 18 with the end of the body pin but to provide means for conveniently turning the body and head, as will be more clearly described hereinafter.

At the intermediate portion of the body bar 10 is slidably fitted an elongated tubular sleeve member 27 formed at one end with an outwardly projecting flange 28 which makes a tapered fillet forming juncture with the sleeve body.

The tool is particularly designed for use in connection with the shock cord mounting of an airplane, a conventional form of which embodies a pair of studs S projecting laterally from a stem T, of the landing gear structure of an airplane. On its outer end each of the studs S is formed with an eccentrically arranged disk D forming a stud head or button providing a flange of varying width about the stud. Over the stud S are looped portions of a shock cord C formed of stretchable material, such as rubber, and commonly covered by fabric or the like. It is the custom to require removal of such cords at prescribed periods to permit inspection of the cord and the cord carrying gear.

With my novel tool the removal of the cord is effected easily and rapidly by initially fitting the boss 20 of the removal head over the button disk D, with the arcuate groove 23 uppermost and fitted on the upper part of the button periphery. The finger projection 21 is disposed downwardly, as shown at Figure 6, for convenient insertion under the loop or bight of the cord. The tool is then rotated, principally through the medium of the cross rod 24, with the finger projection 21 engaging the under side of the bight and the lip 22 engaging the inner side thereof, the removal head being rotated through an arc of approximately ninety degrees, and until the finger assumes a position at the top of the end disk D. During such turning movement the groove 23 disengages the periphery of the disk and attains a downward position. The handle forming body 10 of the tool is then swung downwardly about the end disk of the stud, as illustrated at Figure 8, with the result that the finger projection acts as a lever to remove the loop of the cord from the stud and swing the same over the end disk, despite the tension of the cord, so that the cord is readily detached.

To replace the cord on the gear studs the tool is turned about so that the opposite assembly head 13 is fitted on the end disk D, the outer annular flange 14 thereof sliding over the periphery of the disk so that the groove 15 will firmly engage the upper marginal portion of the disk. When thus disposed the lug 16 is arranged in its uppermost position and in a vertical plane with the body handle 10 extending at a downward inclination with reference to the stud. The sleeve 27 is adjusted to a position below the pivot connection of the head 13 with the handle body and a portion of the cord C is looped about the said sleeve, as clearly shown at Figure 9. The body 10 is then swung through an upward arc, about the pivot 17, causing the elasticity of the cord to slide the sleeve inward toward the stud disk and when the sleeve assumes an upwardly directed position the cord bight is slid over the flange 28 thereof and over the head 13 on to the stud.

As will be readily apparent the tool is designed to eliminate sharp edges and to reduce to a minimum any twisting or rubbing action of the cord, so as to prevent injury to the cord or its fabric covering. Thus, the tool enables rapid and convenient removal and replacement of the cord without damage thereto as the result of such handling.

It is to be understood that the invention is not confined to the specific construction, arrangement or use illustrated and described and that considerable modification may be made therein within the spirit of the invention as defined by the appended claims.

I claim:

1. A tool of the character described comprising a body bar, a tubular head member fitted on one end of the said bar, a socket forming boss on the outer end of the said tubular head, the said boss having an eccentric groove in an arcuate portion thereof, a lever forming projection extending longitudinally from the said boss, and an outwardly projecting transverse lip formed on the outer end of the said projection.

2. A tool for removing the shock cord with reference to the headed stud of an airplane landing gear comprising an elongated body bar, a tubular head member secured on one end of the bar, a socket formed on the outer end of the said head member rotatably engageable with the head of the said stud, a lever forming projection extending longitudinally from one side of the socket, and a lip on the outer end of the said projection adapted to engage the bight of a shock cord for lifting and swinging the said bight over the head of the stud.

3. A tool for removing the shock cord with reference to the headed studs of an airplane landing gear, comprising an elongated body forming bar, a tubular head member fitted on one end of the bar, a socket forming boss on the outer end of the tubular head member, a longitudinally projecting finger element formed at one side of the boss and extending outwardly thereof, an outwardly protruding lip formed on the outer end of the said finger element, the said boss having an eccentric groove in an arcuate portion thereof engageable with the head of the stud, and a rod extended transversely through the body bar and tubular head member for turning the head and finger for lifting and swinging a loop of the shock cord over the head of the cord supporting stud.

FRANK A. TREADWELL.